US011787590B2

(12) United States Patent
Carson et al.

(10) Patent No.: US 11,787,590 B2
(45) Date of Patent: Oct. 17, 2023

(54) CONTAINER WITH ALIGNMENT CORRECTING END FOR MISALIGNED PLACEMENT WITH A DISPLACING ROBOTIC ELEMENT

(71) Applicant: inVia Robotics, Inc., Westlake Village, CA (US)

(72) Inventors: Corwin Carson, Los Angeles, CA (US); Joseph Traverso, Simi Valley, CA (US); Randolph Charles Voorhies, Culver City, CA (US); Lior Elazary, Agoura Hills, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 0 days.

(21) Appl. No.: 17/694,382

(22) Filed: Mar. 14, 2022

(65) Prior Publication Data
US 2022/0194649 A1 Jun. 23, 2022

Related U.S. Application Data

(63) Continuation of application No. 16/017,642, filed on Jun. 25, 2018, now Pat. No. 11,273,947.

(51) Int. Cl.
*B65G 1/04* (2006.01)
*B65D 1/22* (2006.01)
*B65D 1/40* (2006.01)
*B66F 9/19* (2006.01)
*B66F 9/18* (2006.01)
*B66F 9/06* (2006.01)

(52) U.S. Cl.
CPC ............... *B65D 1/22* (2013.01); *B65G 1/04* (2013.01); *B65D 1/40* (2013.01); *B65G 1/0435* (2013.01); *B65G 2201/0235* (2013.01); *B66F 9/063* (2013.01); *B66F 9/18* (2013.01); *B66F 9/195* (2013.01)

(58) Field of Classification Search
CPC ..... B25J 17/0208; B25J 15/00; B65G 1/1373; B65G 1/0435; B66F 9/195
USPC ......................................................... 901/45
See application file for complete search history.

(56) References Cited

U.S. PATENT DOCUMENTS 3,984,006 A * 10/1976 Takeyasu ................. B23P 19/12
414/730
4,179,783 A * 12/1979 Inoyama .................. B23P 19/12
901/45

(Continued)

*Primary Examiner* — Kaitlin S Joerger
(74) *Attorney, Agent, or Firm* — Ansari Katiraei LLP; Arman Katiraei; Sadiq Ansari

(57) ABSTRACT

A container with an alignment correcting end is provided. The alignment correcting end has angled side walls that extend from parallel flat square or rectangular sides of the container. Each angled side wall extends at an angle between 5 and 70 from one of the parallel walls towards the center of the container. Nubs may be disposed about an exterior of the angled side walls. Also, a passive displacing robotic element for performing misaligned or off-axis placement of the container with the alignment correcting end is provided. The passive displacing robotic element provides displacement of the one or more robotic actuators that are used to engage and place the container into the slot in response to the alignment correcting end of the container contacting the slot edge, wall, or other barrier.

13 Claims, 14 Drawing Sheets

(56) References Cited

U.S. PATENT DOCUMENTS

| | | | | |
|---|---|---|---|---|
| 4,561,825 A | * | 12/1985 | Sakata | B25J 15/103 |
| | | | | 414/730 |
| 9,540,171 B2 | * | 1/2017 | Elazary | B25J 9/1697 |
| 11,052,535 B2 | * | 7/2021 | Parks, II | B66F 9/063 |
| 11,117,759 B2 | * | 9/2021 | Elazary | B65G 59/02 |
| 2020/0189845 A1 | * | 6/2020 | Klinge | B66F 9/0755 |

* cited by examiner

CONTAINER WITH ALIGNMENT CORRECTING END FOR MISALIGNED PLACEMENT WITH A DISPLACING ROBOTIC ELEMENT

CLAIM OF BENEFIT TO RELATED APPLICATIONS

This application is a continuation of U.S. nonprovisional application Ser. No. 16/017,642 entitled "Container with Alignment Correcting End for Misaligned Placement With a Displacing Robotic Element", filed Jun. 25, 2018, now U.S. Pat. No. 11,273,947. The contents of application Ser. No. 16/017,642 are hereby incorporated by reference.

BACKGROUND INFORMATION

Item or container placement in slots, even tight slots with dimensions close to dimensions of a container, is a relatively easy task for a human. Slots may be openings with two or more barriers or edges about a rack, shelf, or other storage module. The barriers or walls restrict placement of an item or container into the corresponding slot. Human placement of a container into a slot simply involves the human aligning the edges of the container with the barriers or edges of the slot before inserting the container into that slot.

This seemingly trivial task is difficult for autonomous machines or robots. Robots have to be programmed with the necessary "eye-hand" coordination, whereby one or more cameras and other sensors serve as the robot's eyes, and various actuators (e.g., articulating robotic arms, mechanical claws, suction elements, etc.) serve as the robot's hand for manipulating and placing a container or other object in one or more dimensions.

In particular, robots first have to be programmed to observe in three dimensions using their cameras or sensors. The sensors in combination with the provided programming may provide robotic vision that is less accurate than the human eye and slower in deciphering the world before the cameras and sensors.

The robotic eye-hand coordination is also complicated by the fact that the various actuators that the robots use to engage and move containers or items may not have the same dexterity as the human arm, hand, and fingers. Minute adjustments that are relatively quick and easy for a human to perform, may be more difficult for robots to perform. In other words, the actuators may have more limited range of motion, may be slower to move, and may be less accurate in their movements than the human arm, hand, and fingers.

DETAILED DESCRIPTION OF PREFERRED EMBODIMENTS

Figure 1:
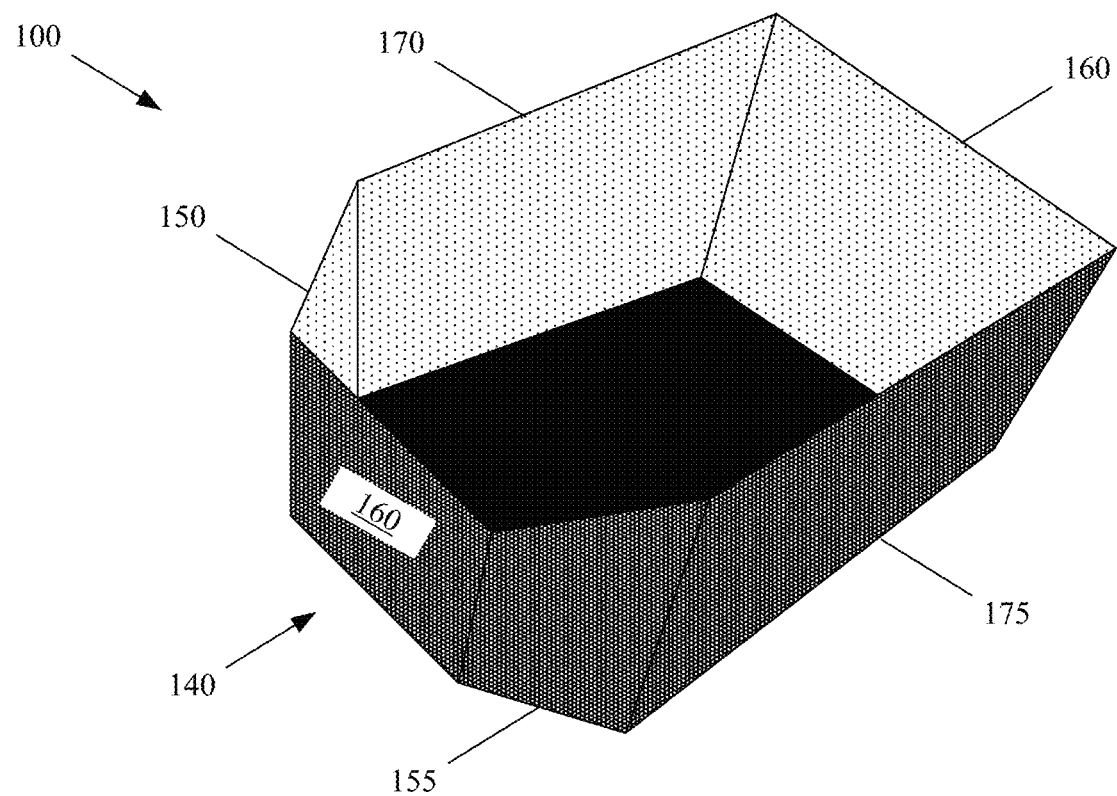
FIG. 1 provides a top perspective view of a container with an alignment correcting end in accordance with some embodiments.

The disclosure is for a container with an alignment correcting end, and a displacing robotic element for performing misaligned or off-axis placement of the container with the alignment correcting end. The alignment correcting end redirects the container into a slot upon misaligned contact with an edge, wall, or other barrier of the slot. The displacing robotic element provides displacement of the one or more robotic actuators that are used to engage and place the container into the slot in response to the alignment correcting end of the container contacting the slot edge, wall, or other barrier. More specifically, the displacing robotic element corrects alignment of the one or more robotic actuators engaging the container to compensate for any shifting or movement to the container due to displacement caused by the alignment correcting end of the container correcting for misaligned insertion of the container into a slot.

The slot can be an opening on a rack, shelf, tray, table, or other storage module. The slot can be bounded on two or more sides (e.g., bottom side and at least one of the left, right, and top sides) with a physical obstruction, such as a protruding edge, extension, wall, or other barrier, and unbounded or unobstructed on other sides.

For instance, a slot can have a bottom wall onto which the container can be placed, and side walls restricting the horizontal placement of the container. Horizontal misalignment of a traditional rectangular or square container with a slot having side walls, especially side walls that are separated by a distance substantially equal to the width of the container, prevents straight insertion of the container into this bounded slot. The misalignment can also cause the container to turn, tilt, rotate, or otherwise become further misaligned with the slot upon the misaligned container contacting one of the slot barriers.

A slot can have top and bottom walls and no side walls, with the top and bottom walls restricting the vertical placement of the container. Here again, the slot walls would prevent misaligned insertion of a traditional rectangular or square container into the slot.

A slot can also have walls on all but one side (e.g., front or top). Any of the edges, walls, or other barrier walls of a slot can be permanent (i.e., fixed) or removable. For example, sides of other containers can form side walls for a particular slot.

The alignment correcting end of the disclosed container, and more specifically, the shape and configuration of the alignment correcting end, naturally corrects for any misaligned placement of the container. The alignment correcting end may be a contoured surface that, upon contact with a slot wall, deflects and slides the container into the slot as a force is continually applied to push the container into the slot, regardless of whether the container or force being applied is misaligned with the slot opening. The contoured surface minimizes the degree or angle with which the container shifts upon contacting the slot wall, thereby preventing the point of contact with slot wall from becoming an axis about which the container rotates.

Depending on the size (e.g., height, width, and/or depth) of the container, the alignment correcting end may correct for several inches of misalignment. For instance, the alignment correcting end may correct for misalignment up to half the width of the container when correcting for horizontal misalignment, and up to half the height of the container when correcting for vertical misalignment.

The alignment correcting end can be disposed on one or more sides of a container. For example, the same or different alignment correcting end can be disposed on the front and back sides of the container, left and right sides of the container, top and bottom sides of the container, or any other combination of the front, back, left, right, top, and bottom sides of the container.

Figure 2:
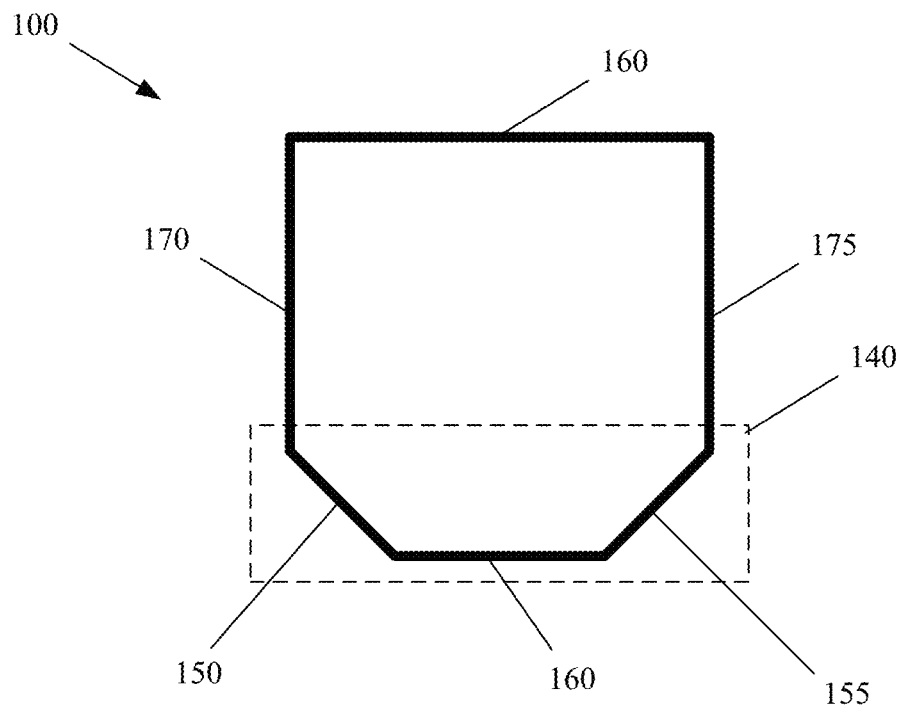
FIG. 2 provides a top view of the container with the alignment correcting end.
Figure 3:
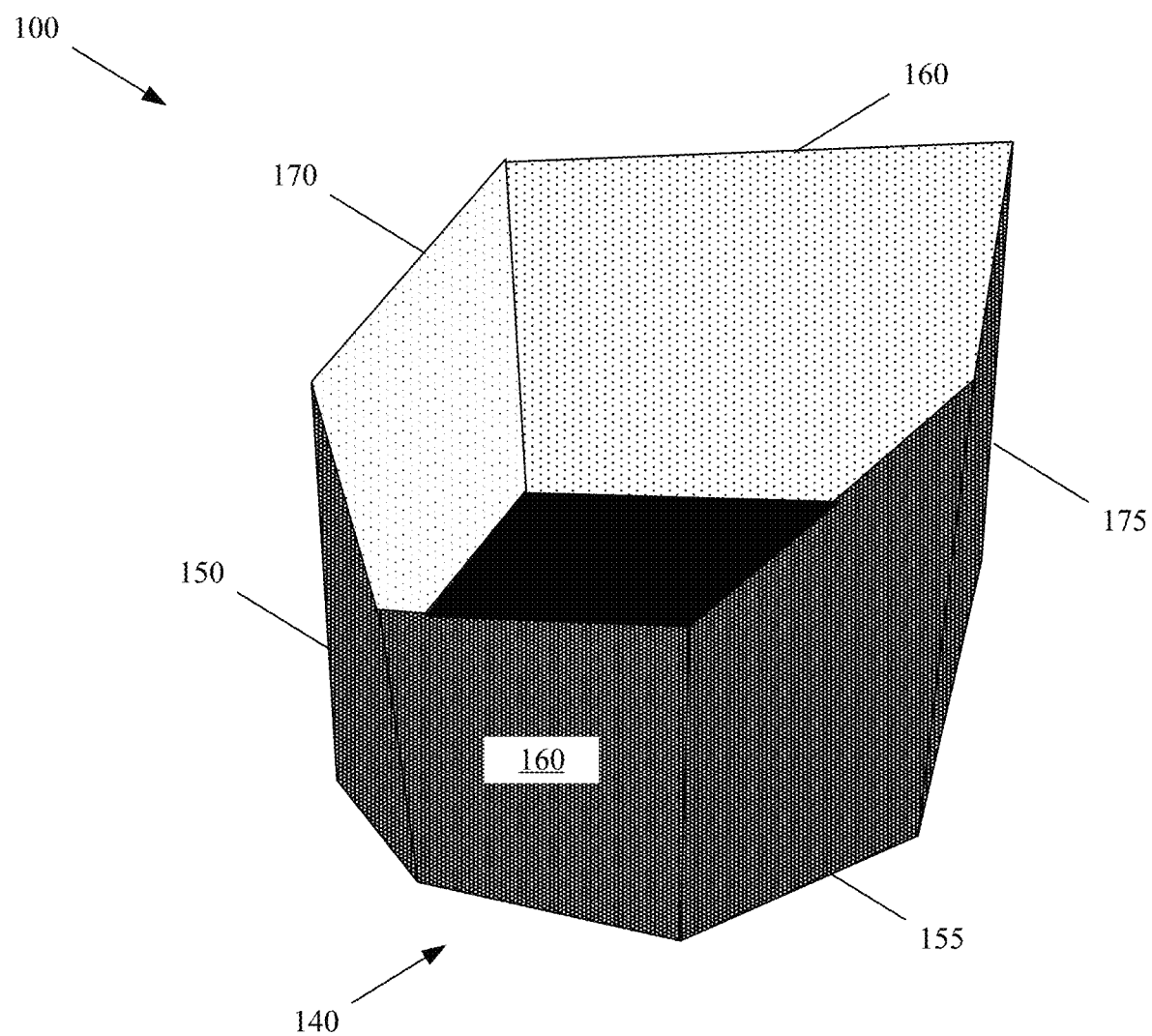
FIG. 3 provides a front perspective view of the container with the alignment correcting end.

FIG. 1 provides a top perspective view of a container 100 with an alignment correcting end in accordance with some embodiments. FIG. 2 provides a top view of the container 100 with the alignment correcting end. FIG. 3 provides a front perspective view of the container 100 with the alignment correcting end.

The container 100 is a multi-sided and partially or fully enclosed volume for storing one or more objects. The back 160, left 170, and right 175 sides of the container 100 are vertical walls, and the front side of the container 100 may be an alignment correcting end 140 with a semi-hexagonal or trapezoidal configuration. The left side 170 is parallel to the right side 175 of the container. In some embodiments, the alignment correcting end 140 has angled side walls 150 and 155 that are angled towards the center of the container 100 with a flat rectangular or square section 160 connecting the angled side walls 150 and 155. The section 160 may be parallel to the back side 160 of the container.

Depending on the size of the container 100 and its use, the angle for the angled side walls 150 and 155 of the alignment correcting end 140 can range between 5 and 70 degrees. For instance, a box with a smaller length and width (e.g., 5 inches) may have larger angles for the angled side walls of the alignment correcting end, while a box with a greater length and width (e.g., 24 inches) may have smaller angles for the angled side walls of the alignment correcting end, because the angled side walls from the alignment correcting end of the larger box can extend further out than those of the smaller box, and as a result provide a more gradual correction of the misalignment. The angled side walls 150 and 155 of the alignment correcting end 140 can also slope downwards and provide an opening with which to view into the container 100 volume.

Each of the vertically extending walls (e.g., back wall 160, left wall 170, right wall 175, and angled side walls 150 and 155) of the container 100 is connected by a bottom section of the container 100. Collectively, these walls and sections create a three-dimensional volume for storing objects.

Figure 4:
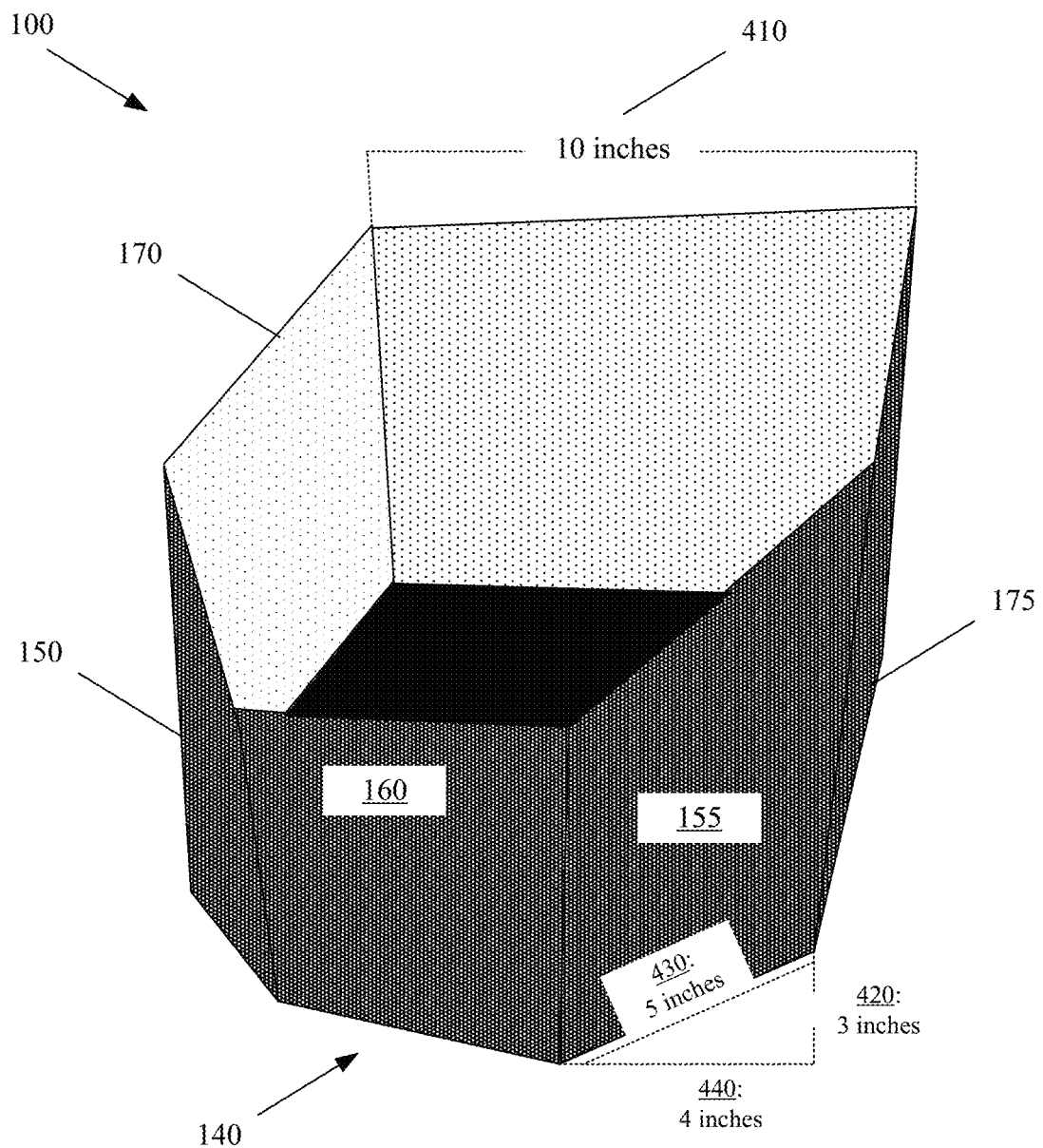
FIG. 4 conceptually illustrates an amount of horizontal misalignment that can be corrected with the alignment correcting end of the container having a particular configuration and example measurements.

The alignment correcting end 140 can correct for horizontal misalignment up to the width of an angled side wall 150 or 155 (e.g., the x-axis distance between the start of the angled side wall and the end of the angled side wall 150 or 155). FIG. 4 conceptually illustrates an amount of horizontal misalignment that can be corrected with the alignment correcting end 140 of the container 100 having a particular configuration and example measurements. In this figure, the total width 410 of the container is 10 inches, each angled side wall 150 and 155 of the alignment correcting end 140 extends 3 inches 420 from the container front side, and each angled side wall 150 and 155 is 5 inches 430 in length. As a result, each angled side wall 150 and 155 for container 100 can correct for up to 4 inches of horizontal misalignment 440. For instance, if there is up to 4 inches of horizontal misalignment between a barrier and the right side 175 of the container 100, the angled right side wall 155 of the alignment correcting end 140 will make contact with the barrier. The angle of the angled right side wall 155 will then cause the container 100 to slide past the barrier with the center of the container 100 being horizontally displaced or shifted away from the barrier as a result of the deflection by the angled right side wall 155 of the alignment correcting end 140.

Figure 5:
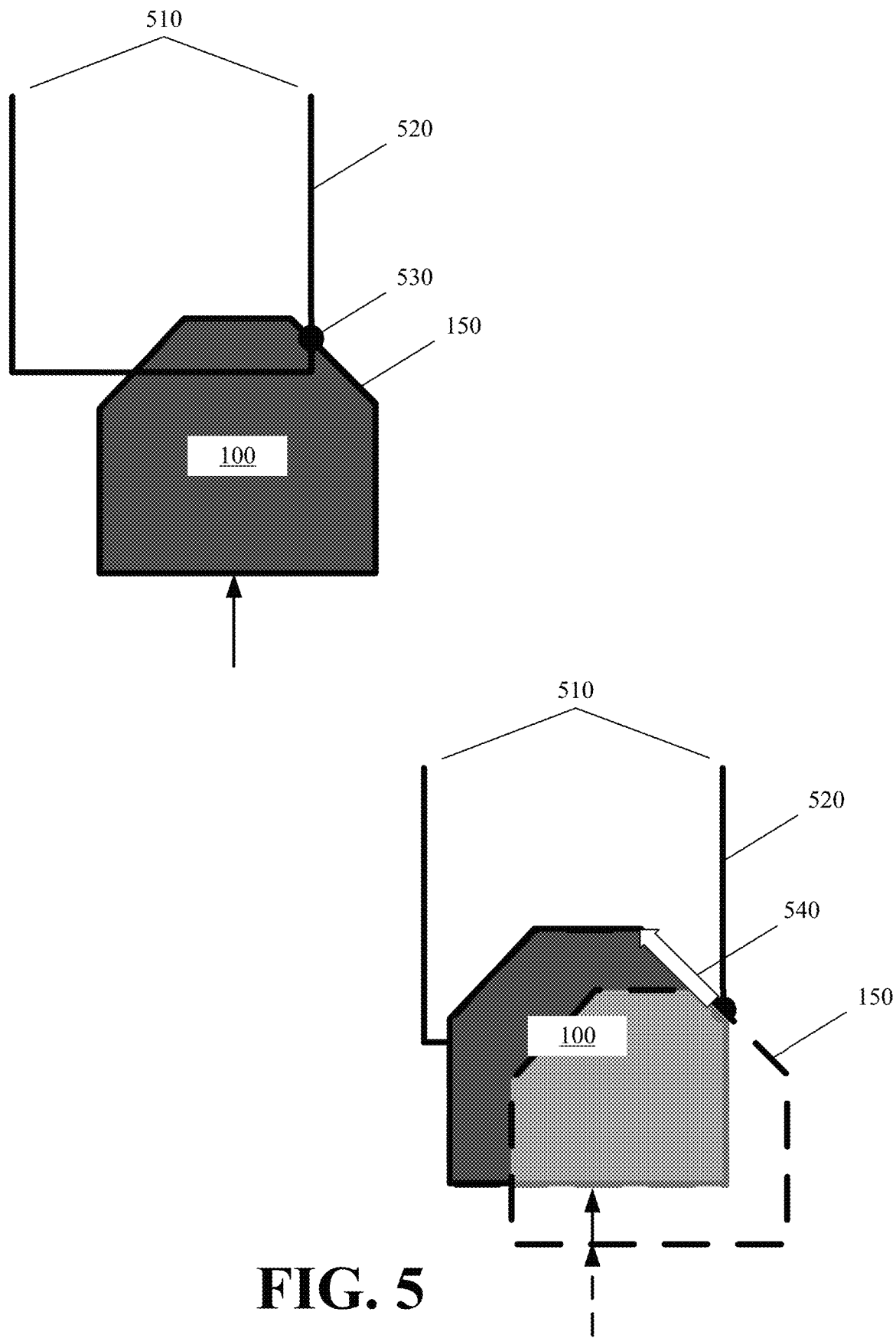
FIG. 5 conceptually illustrates the angled left side wall of the alignment correcting end correcting a misaligned horizontal placement of the container into a slot.

FIG. 5 conceptually illustrates the angled left side wall 150 of the alignment correcting end 140 correcting a misaligned horizontal placement of the container 100 into a slot 510. The slot 510 has at least one horizontal or side boundary 520 (e.g., vertically extending walls or other barriers demarcating the edges of the slot 510).

The container 100 is horizontally misaligned with the slot boundary 520. Accordingly, when the alignment correcting end 140 of the container 100 is initially pushed into the slot 510, the boundary 520 of the slot 510 contacts (at 530) the angled left side wall 150 of the alignment correcting end.

As the container 100 is pushed further into the slot 510, the angled surface of the angled left side wall 150 produces a horizontal displacement of the container 100, and in doing so, gradually centers the container 100 in the slot 510 as the push force is continually exerted on the container 100. In particular, the horizontal displacement is created as a result of the angled left side wall 150 sliding (at 540) past the boundary 520 because of its angled or contoured surface relative to the boundary 520. Moreover, the horizontal displacement of the container 100 occurs even when the push force is not adjusted to correct for the misaligned placement or the entity providing the pushing force (e.g., a human or robot) does not rotate or otherwise change how the container is held and pushed into the slot.

Figure 6:
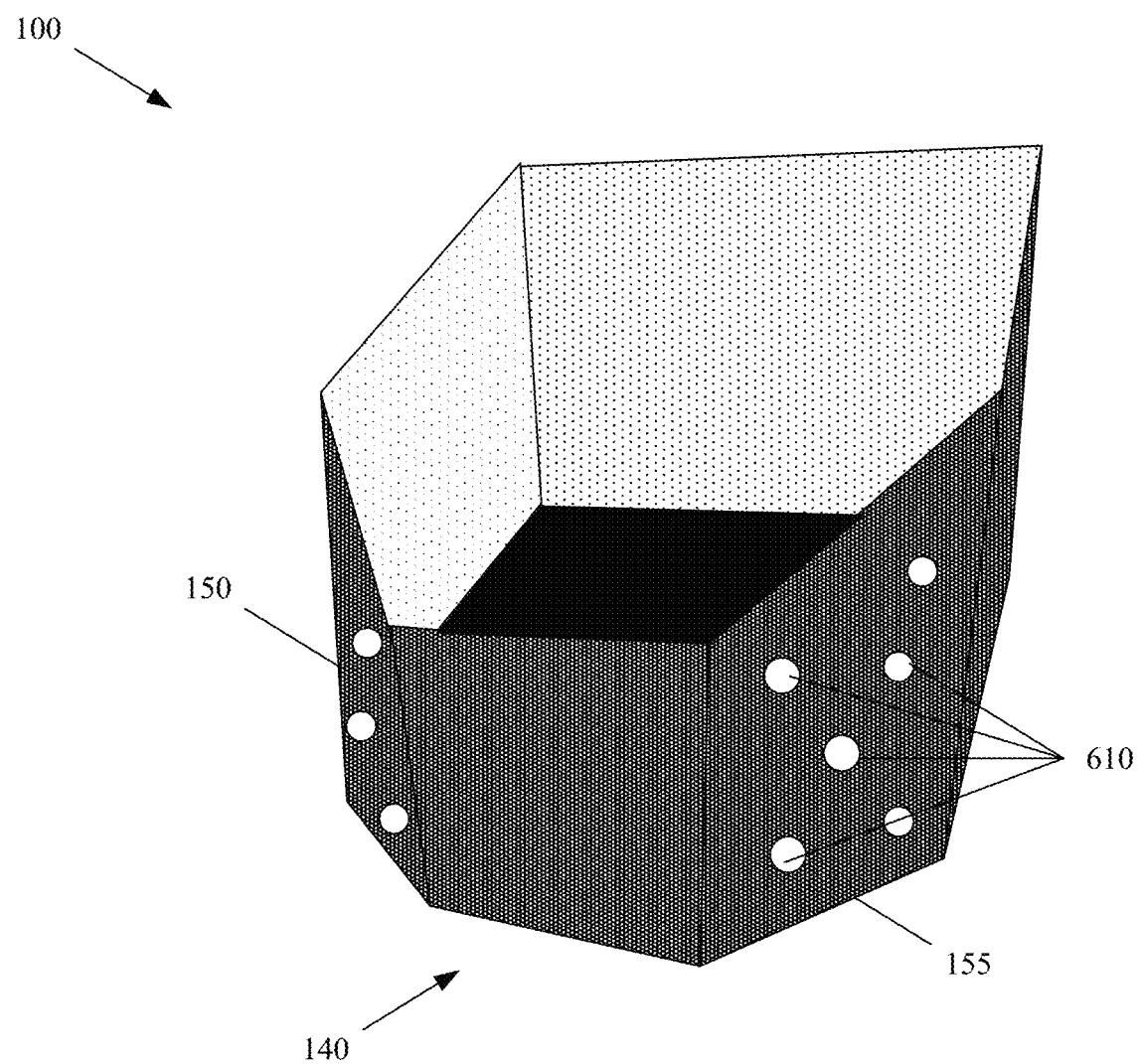
FIG. 6 illustrates an example container with an alignment correcting end modified with several nubs.

The alignment correcting end 140 of the container 100 can be modified to include one or more nubs. FIG. 6 illustrates an example container with an alignment correcting end 140 modified with several nubs 610. The nubs 610 are disposed about the exterior of the angled left and right side walls 150 and 155 of the alignment correcting end 140. The nubs 610 are protrusions that extend some minimal distance (e.g., less than two inches) from the surface of the angled left and right side walls 150 and 155. The nubs 610 can be concave in shape and formed from plastic or other rigid material. The nubs 610 are illustrated to have a circular shape in FIG. 6, but they can have any number of different shapes.

The nubs 610 reduce the surface area contact between the angled left and right side walls 150 and 155 of the container 100 and a slot barrier should the container be misaligned and either of the angled left and right side walls 150 and 155 come into contact with the slot barrier during placement. The reduced surface area contact reduces friction, thereby making it easier to push the container 100 into a slot even when misaligned and the container 100 impacts one or more edges, barriers, or walls of the slot.

The nubs 610 can also be disposed under the container or any surface of the container 100 that is expected to make contact with another surface or object during placement. For instance, the nubs 610 can be disposed on the exterior of the bottom side of the container 100.

Figure 7A:
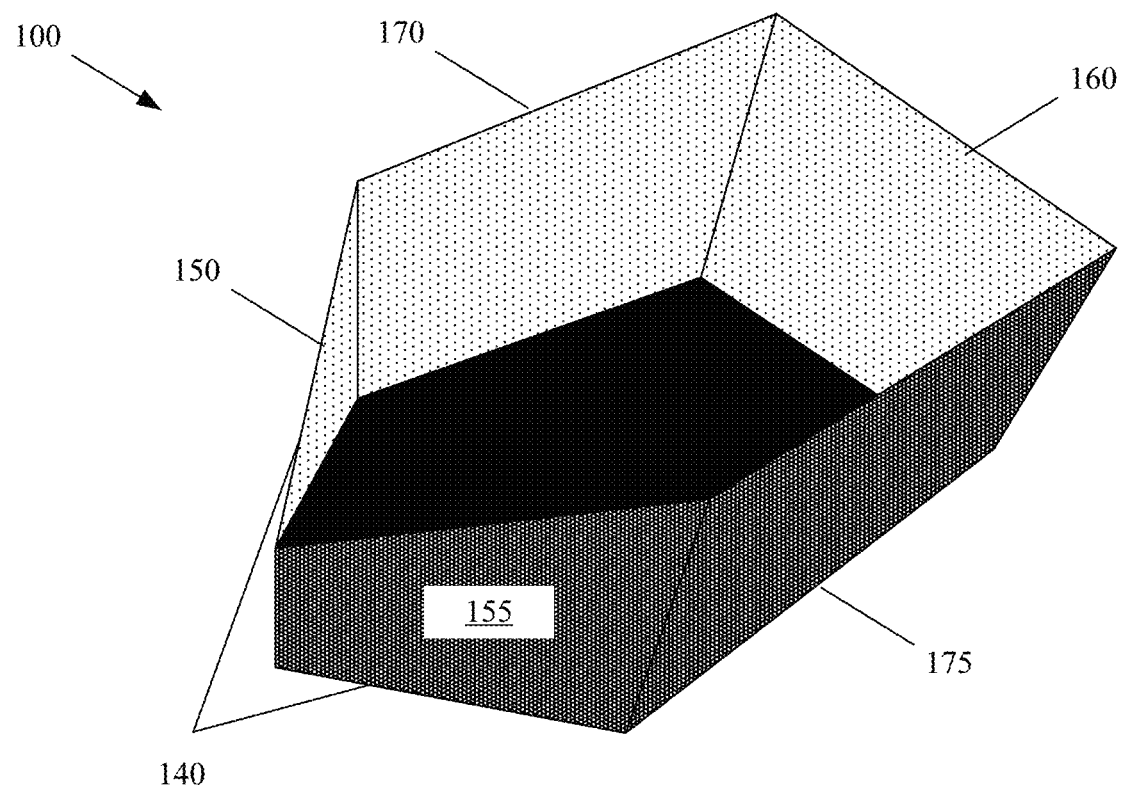
FIGS. 7A and 7B illustrate different views of an example container with an alignment correcting end having a triangular configuration.
Figure 7B:
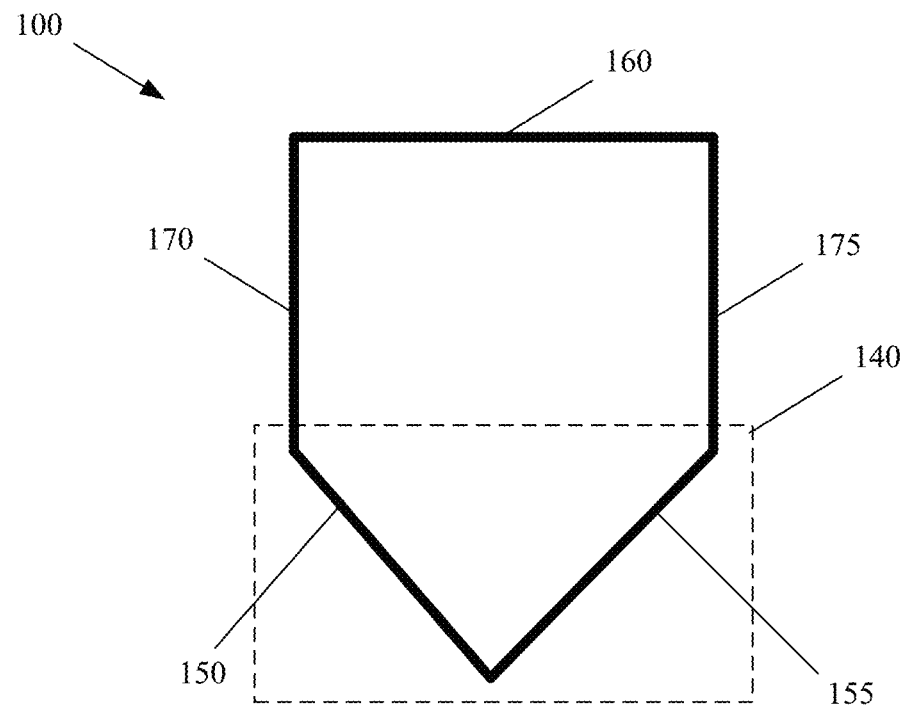

FIGS. 7A and 7B illustrate different views of an example container 100 with an alignment correcting end 140 having a triangular configuration. In these figures, the angled left and right side walls 150 and 155 of the alignment correcting end 140 directly meet without the flat rectangular or square section 160 illustrated in FIGS. 1-3.

Figure 8A:
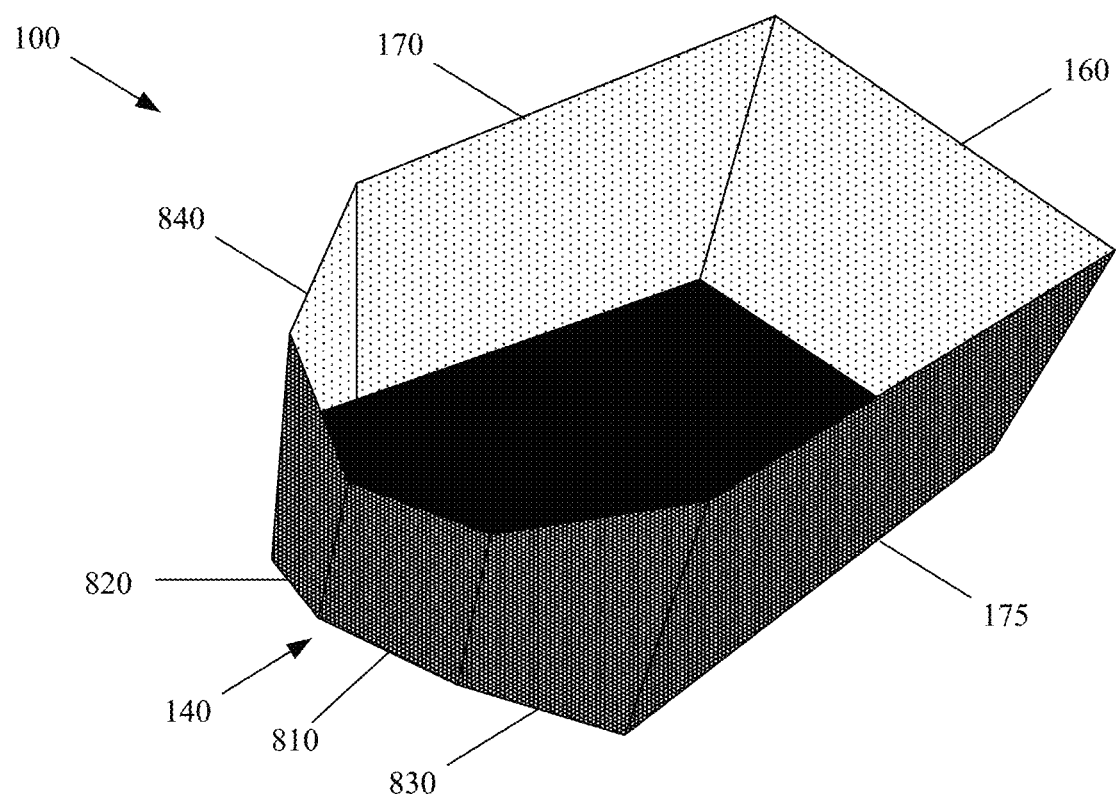
FIGS. 8A and 8B illustrate different views of an example container with an alignment correcting end having a semi-octagonal configuration.
Figure 8B:
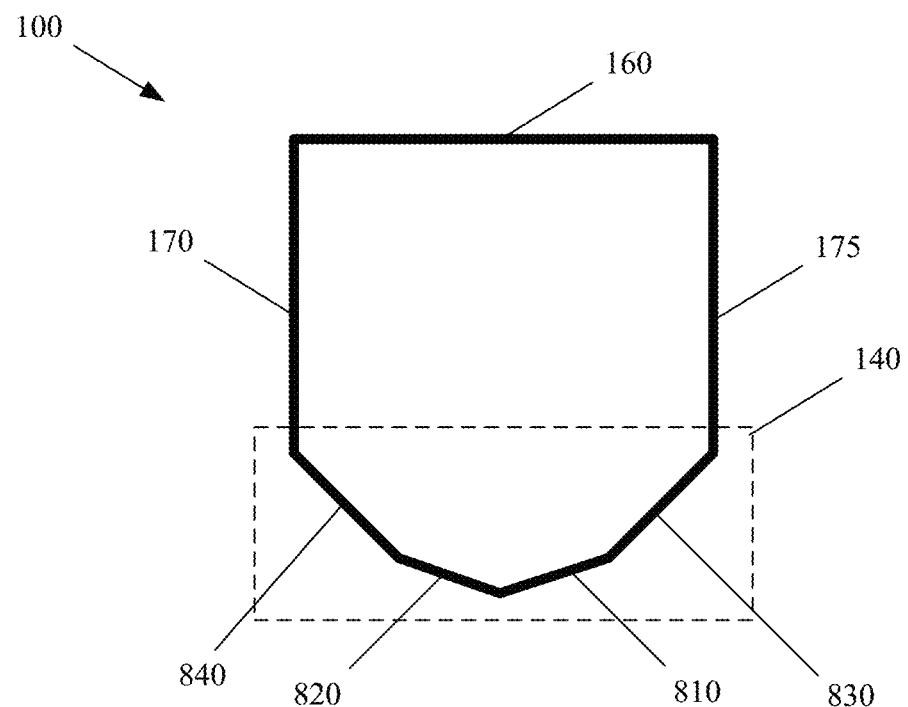

FIGS. 8A and 8B illustrate different views of an example container 100 with an alignment correcting end having a semi-octagonal configuration. With the semi-octagonal configuration, the alignment correcting end 140 has two right and left side segments 810, 820, 830, and 840. The proximal segments 810 and 820 (e.g., segments closest to the end of the container 100) may have a smaller or greater angle than the distal segments 830 and 840 (e.g., segments furthest from the end of the container 100).

Figure 9:
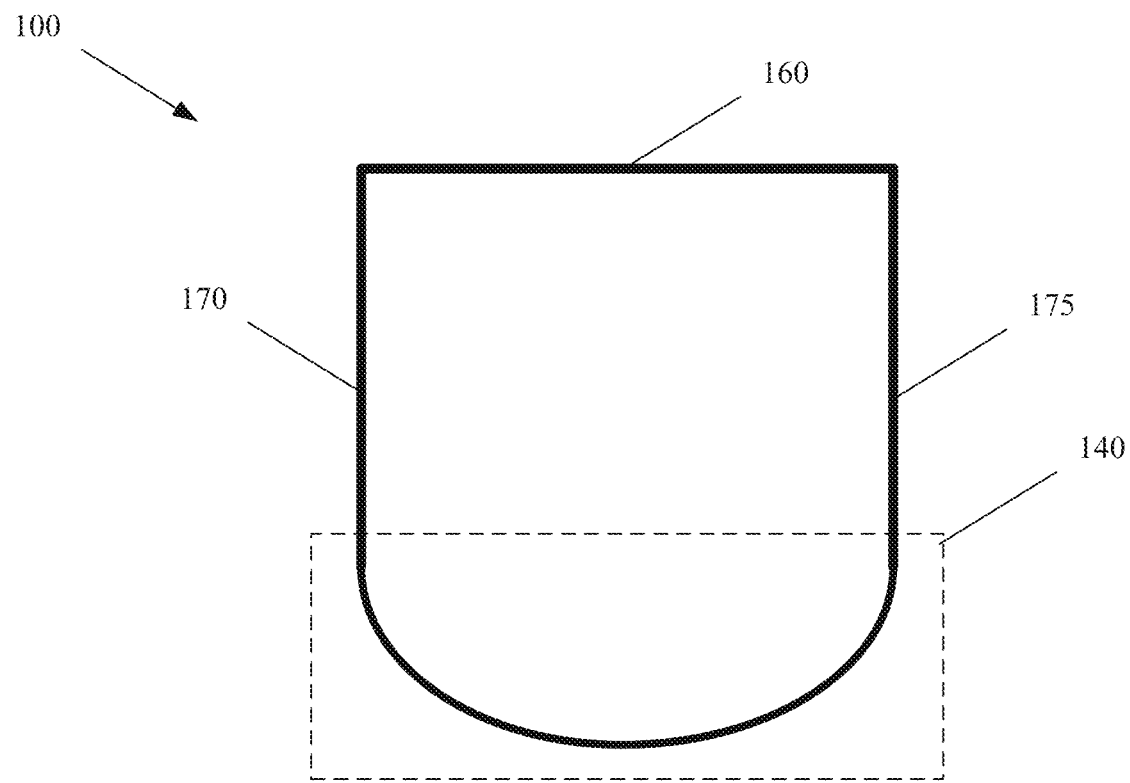
FIG. 9 illustrates an example curved or rounded shape for the alignment correcting end of the container.

These examples illustrate some of the many possible configurations of the alignment correcting end. Additional embodiments and configurations for the alignment correcting end are within the scope of this disclosure. For instance, the alignment correcting end can be any regular or irregular multi-faceted, curved, or rounded shape with a narrowing width in order to correct for horizontal misalignment, and/or a narrowing height in order to correct for vertical misalignment. FIG. 9 illustrates an example curved or rounded shape for the alignment correcting end 140 of the container 100.

Moreover, these various alignment correcting ends can be disposed about one or more different sides of the container. For example, a container can have a first alignment correcting end with the trapezoidal configuration of FIG. 1 for a left side of the container and a second alignment correcting end with the triangular configuration of FIGS. 7A and 7B for a right side of the same container. A different container can have these or other alignment correcting ends disposed about top and bottom sides in order to correct for vertically misaligned placement of the container into a slot having vertical (e.g., top and bottom) boundaries.

The alignment correcting end, as well as the rest of the container, can be made of cardboard, plastic, metal, or other rigid material. The material should be of sufficient rigidity such that the material does not deform in response to impact of the material against a slot barrier or other obstacle with at least a push force that can be generated by a human or robot placing the container. The material forming the container can be one continuous piece (e.g., cardboard) that is folded and bent to the form of the desired container. The material forming the container can also be several separate sections that are adhered or otherwise connected or coupled together. In some embodiments, the material can be flexible or bend to absorb the impact, provided that the material does not permanently deform, and substantially restores its shape once the point of impact is deflected, slid past, or removed.

Figure 10:
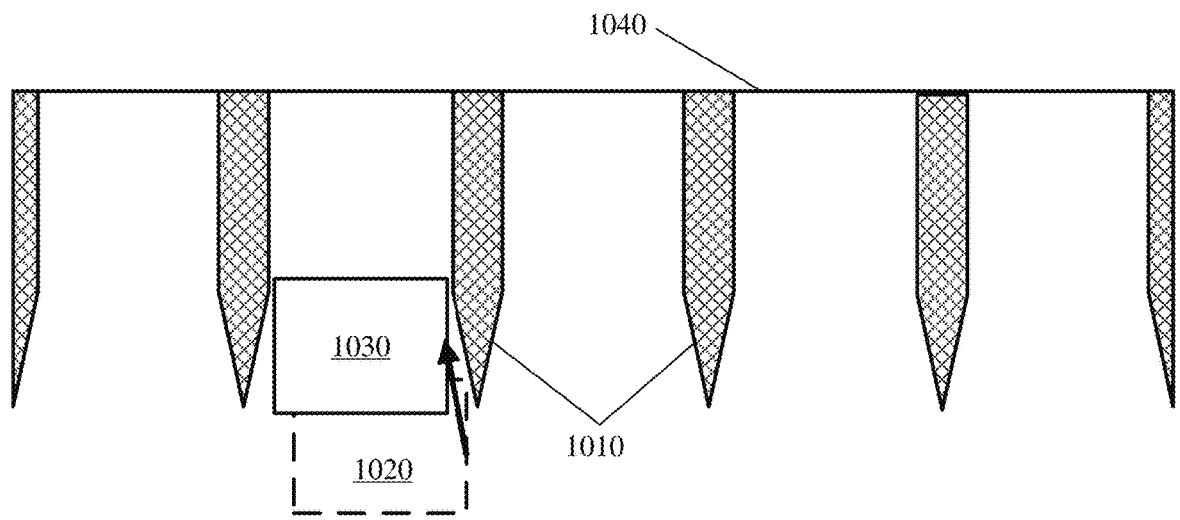
FIG. 10 illustrates a top view of alignment correcting slot barriers in accordance with some embodiments.
Figure 11:
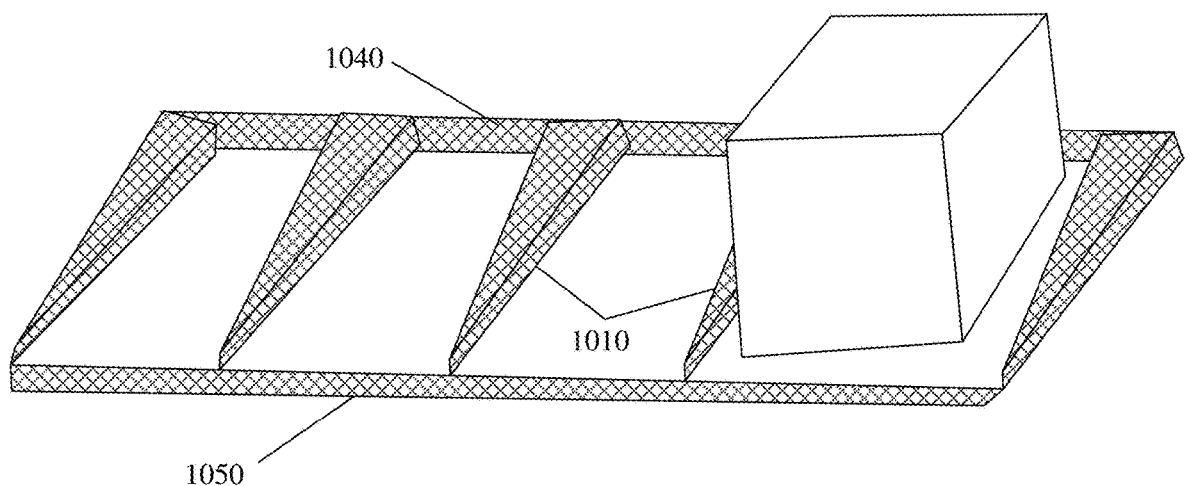
FIG. 11 illustrates a perspective view of the alignment correcting slot barriers.

Alignment correction can also be provided by the slot barriers. FIG. 10 illustrates a top view of alignment correcting slot barriers 1010 in accordance with some embodiments. FIG. 11 illustrates a perspective view of the alignment correcting slot barriers 1010 of FIG. 10. As shown, the alignment correcting slot barriers 1010 are angled walls that separate the positioning of adjacent container slots. In these figures, the alignment correcting slot barriers 1010 are wedge or triangular shaped. In some embodiments, the alignment correcting slot barriers 1010 can have trapezoidal, semi-hexagonal, octagonal, other multi-sided, rounded, or other contoured shapes, similar to the different shapes for the alignment correcting end 140 of container 100.

The alignment correcting slot barriers 1010 may extend upwards by a few inches or up to and over the full height of a container. The alignment correcting slot barrier 1010 width may vary depending on its length and the desired angle or desired amount of misalignment correction to be provided by the slot barriers 1010.

The alignment correcting slot barriers 1010 function in a similar manner as the alignment correcting end 140 of the above described container 100. The alignment correcting slot barriers 1010 can be used in conjunction with the container 100 with the alignment correcting end 140 or with traditional square, rectangular, or other containers that do not have the alignment correcting end 140. The alignment correcting slot barriers 1010 guide a misaligned container into a proper slot position. For example, a container is initially shown at 1020 in FIG. 10 to be misaligned with one of the alignment correcting slot barriers 1010. As the container is pushed into the slot, the alignment correcting slot barriers 1010 makes impact with a side of the container. As the container is further pushed into the slot, the angle of the alignment correcting slot barrier 1010 shifts and redirects the container towards the center of the slot as shown at 1030.

Two or more of the alignment correcting slot barriers 1010 may be distributed across and attached to a back plate 1040 or a bottom plate 1050. When the alignment correcting slot barriers 1010 are attached to a back plate 1040 or a bottom plate 1050, the alignment corrected slot barriers 1010 can be moved as one element. The single element can be inserted into or onto a slot, rack, or other surface that does not have barriers in order to provide the slot, rack, or other surface with configurable or interchangeable alignment correcting slot barriers 1010. For instance, two different plates with different sized and spaced alignment correcting slot barriers 1010 can be interchangeably inserted into or onto a slot, rack, or other surface in order to reconfigure the slot barriers 1010 and the positioning of containers on the slot, rack, or other surface.

The alignment correcting slot barriers 1010, as well as, the back plate 1040 or bottom plate 1050 can be made of plastic, metal, wood, or other rigid material. The individual alignment correcting slot barriers 1010 can be attached or affixed to the back plate 1040 or bottom plate 1050 with customized spacing and sizes.

The containers 100 with the different alignment correcting ends 140 and/or the alignment correcting slot barriers 1010 are provided to assist with robotic container placement. The accuracy with which a robot places containers into slots or other storage locations is limited by the accuracy of the robot's sensors, degree and precision of the robot's movements, degree and precision of the one or more actuators used by the robot to engage and place the containers, and the software that uses the information from the sensors in order to direct movements of the robot and its placing actuator(s). This is especially true when using robots to place containers in tight slots with dimensions (e.g., height, width, or depth) substantially similar to those of the containers, thereby leaving little to no extra space for misaligned entry of the containers into those slots.

The alignment correcting end 140 of the container 100 and/or the alignment correcting slot barriers 1010 lessen the dependence of the robots on their sensors, movements, actuators, and software to achieve a proper placement of a container (e.g., enter or insert a container into a slot even with some amount of misalignment that can be corrected for by the alignment correcting end 140 of the container 100 or the alignment correcting slot barrier 1010). More specifically, since the alignment correcting end 140 and/or alignment correcting slot barrier 1010 correct for misaligned placement of the containers by the robots, the robots can operate with fewer or less accurate sensors, less complicated software, less precise movements, and/or less precise hardware. Consequently, the robots can be autonomous machines that are less expensive to develop and manufacture, than the robots that require more sensors, more accurate sensors, more complicated software, more precise hardware, or other changes that increase the sophistication and capabilities of the robots. Another benefit of the reduced accuracy with which the robots can place the containers 100 with the alignment correcting ends 140 or place containers using the alignment correcting slot barriers 1010 is that the robots can operate faster and more efficiently (e.g., place more containers into slots in a given amount of time or complete a greater number of tasks in the given amount of time). In particular, the robots spend less time and resources trying to perfectly align a container before placement because the alignment correcting end 140 and/or alignment correcting slot barrier 1010 can compensate for some amount of misalignment that may result from a faster and less accurate positioning of the container by the robot.

The alignment correcting end 140 and alignment correcting slot barrier 1010 have angled or contoured surfaces in order to displace (e.g., horizontally or vertically) the container and correct for a misalignment, wherein the misalignment causes the container to contact a slot barrier or other obstacle. This displacement, however slight, shifts the container as it is held or otherwise engaged during placement of the container by the robot. The resulting shift could cause the container to fall, slide, tilt, become dislodged, or become temporarily disengaged, thereby altering, in some way, the robot's engagement of the container if the robot is unable to absorb or otherwise compensate for the shift. For instance, a robot may use a vacuum or one or more suction cups to create a seal against a surface of the container. Upon the alignment correcting end 140 of the container 100 impacting a barrier, the container 100 may be displaced (e.g., horizontally or vertically). The seal between the vacuum or suction cups and the surface of the container 100 can be temporarily or permanently lost or weakened because of the displacement. This can make insertion of the container 100 into the slot more difficult or impossible for the robot. Even if the robot reengages the container 100, the container may rotate, tilt, or otherwise change orientation relative to the previous engagement the robot had of the container 100, with the change in orientation, once again, making insertion of the container 100 into the slot more difficult or impossible for the robot.

Accordingly, some embodiments provide a displacing element for the robots, and more specifically, a displacing element for the one or more actuators with which a robot engages and places a container. Some embodiments provide a passive displacing element that mechanically operates with no power (e.g., electricity), engine, motor, or other power-created force. Some embodiments provide an active displacing element that operates with power (e.g., electricity), engine, motor, or other power-created force.

The robot is an autonomous machine that performs various tasks in an automated manner using motorized or powered locomotion, a set of sensors, and a set of motorized or powered actuators. The robot actuators engaging and placing the containers can be any one or more of a vacuum, suction cup, articulating robotic arm, mechanical claw, pincher, magnet, air cannon, motorized pushing element, lift that can tilt on one or more axis, or other elements with which a robot can hold and release an object. These actuators are connected to the robot body or structure. The robot body or structure may include means for locomotion (e.g., wheels, legs, propellers, tracks, etc.), batteries for powering the actuators and locomotion means, sensors (e.g., cameras, LIDAR, accelerometers, compass, Global Positioning System modules, etc.), and other electronics (e.g., processors, wireless radios, memory, etc.).

The displacing element may be located at the base of the actuators, adjacent to the actuators, or some point of intersection between the actuators and the robot body. The displacing element may also couple or otherwise attach the actuators to the robot body.

The displacing element displaces the one or more actuators when an external force is imposed on the actuators or a container, or other object, engaged by the actuators. In doing so, the displacing element helps the one or more actuators retain their engagement of the container. In particular, displacing the actuators helps prevent shifting or movement at the point of engagement between the one or more actuators and an engaged container when an external force is imposed on the engaged container (e.g., a correction is made to the alignment of the container as a result of contact between the alignment correcting end of the container and a barrier).

Figure 12:
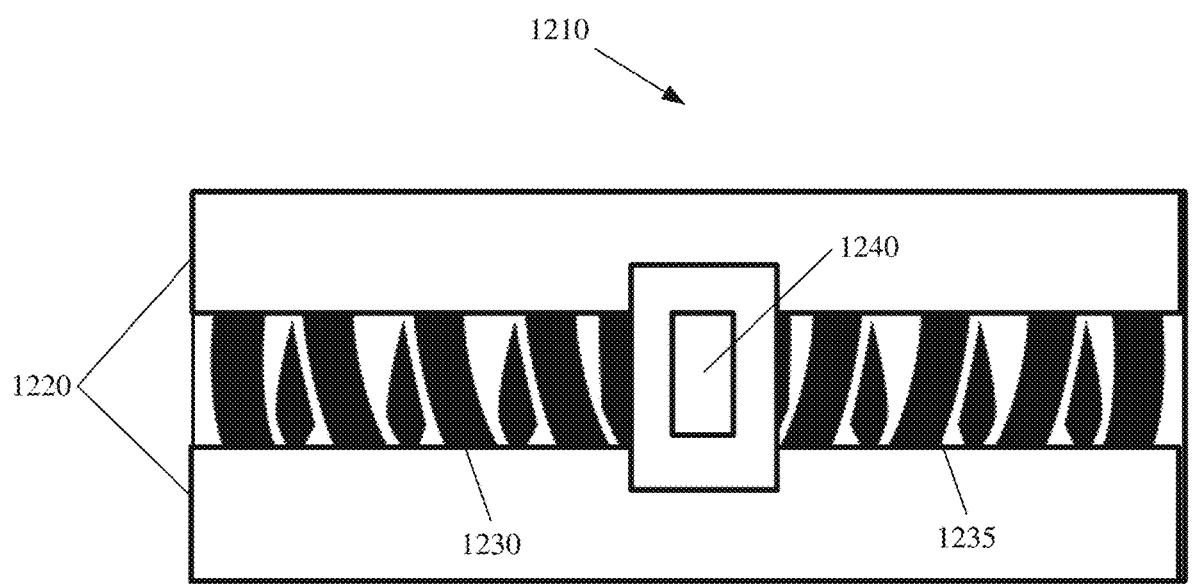
FIG. 12 conceptually illustrates a passive displacing element in accordance with some embodiments.

A passive displacing element may operate using one or more springs (e.g., compression springs, extension springs, torsion springs, wave springs, constant force springs, or other mechanical springs), coils, or compressible foam to passively displace the actuators that are coupled to the passive displacing element about a horizontal axis, a vertical axis, or multiple axis (e.g., three-dimensional displacement). FIG. 12 conceptually illustrates a passive displacing element 1210 in accordance with some embodiments. The passive displacing element 1210 is illustrated with a rail 1220, opposing springs 1230 and 1235, and a mount 1240.

The rail 1220 is a chamber that is affixed or coupled to the robot body, frame, or other structure (e.g., base of an actuator). The chamber may be enclosed but for an opening. The chamber retains the springs 1230 and 1235 within it. The mount 1240 is disposed over the chamber and can move across the opening of the rail 1220 based on compression and extension of the opposing springs 1230 and 1235.

Fixed to one end of the rail 1220 is a first of the opposing springs 1230. Fixed to the other end of the rail 1220 is a second of the opposing springs 1230. The ends of the springs 1230 and 1235 that face each other may be attached to a section of the mount 1240 that extends within the chamber or rail 1220 cavity. The opposing springs 1230 and 1235 compress and extend in opposite directions. Consequently, when there is no external force imposed on the mount 1240, the opposing forces of the springs 1230 and 1235 dispose the mount 1240 about centrally on the rail 1220. An external force exerted on the mount 1240 will cause displacement of the mount 1240 by compressing the spring 1230 or 1235 that is affixed to the rail 1220 end in the direction of the external force, while extending the spring 1230 or 1235 that is affixed to the rail 1220 end that is opposite to the direction of the external force. As the external force is reduced or removed, the spring forces will return the mount 1240 back to the central position. In other words, the mount 1240 slides back and forth across the surface of the rail 1220 when displaced.

The mount 1240 may be a bracket extending up from within the rail 1220 chamber and out over the rail 1220. The one or more actuators of the robot used to engage and/or place a container may be mounted to the bracket of the mount 1240. The actuators (including a base or stem of the actuators) can be mounted with a nut and bolt assembly or other coupling assembly. Other supports for the actuators and/or wiring for controlling and powering the actuators can run through or off the mount 1240.

Once the actuators are mounted to the mount 1240, the actuators and any containers engaged by the actuators effectively become an extension of the mount 1240. An external force directly placed on the actuators or a container engaged by the actuators will indirectly propagate to the mount 1240. The opposing springs 1230 and 1235 can absorb the external force by compressing or extending, which in turn, displaces the mount 1240 from its default center position (e.g., lateral movement about the surface of the rail 1220). Since the robot actuators engaging the container are mounted to the mount 1240, any displacement of the mount 1240 will also displace the actuators and container.

Figure 13:
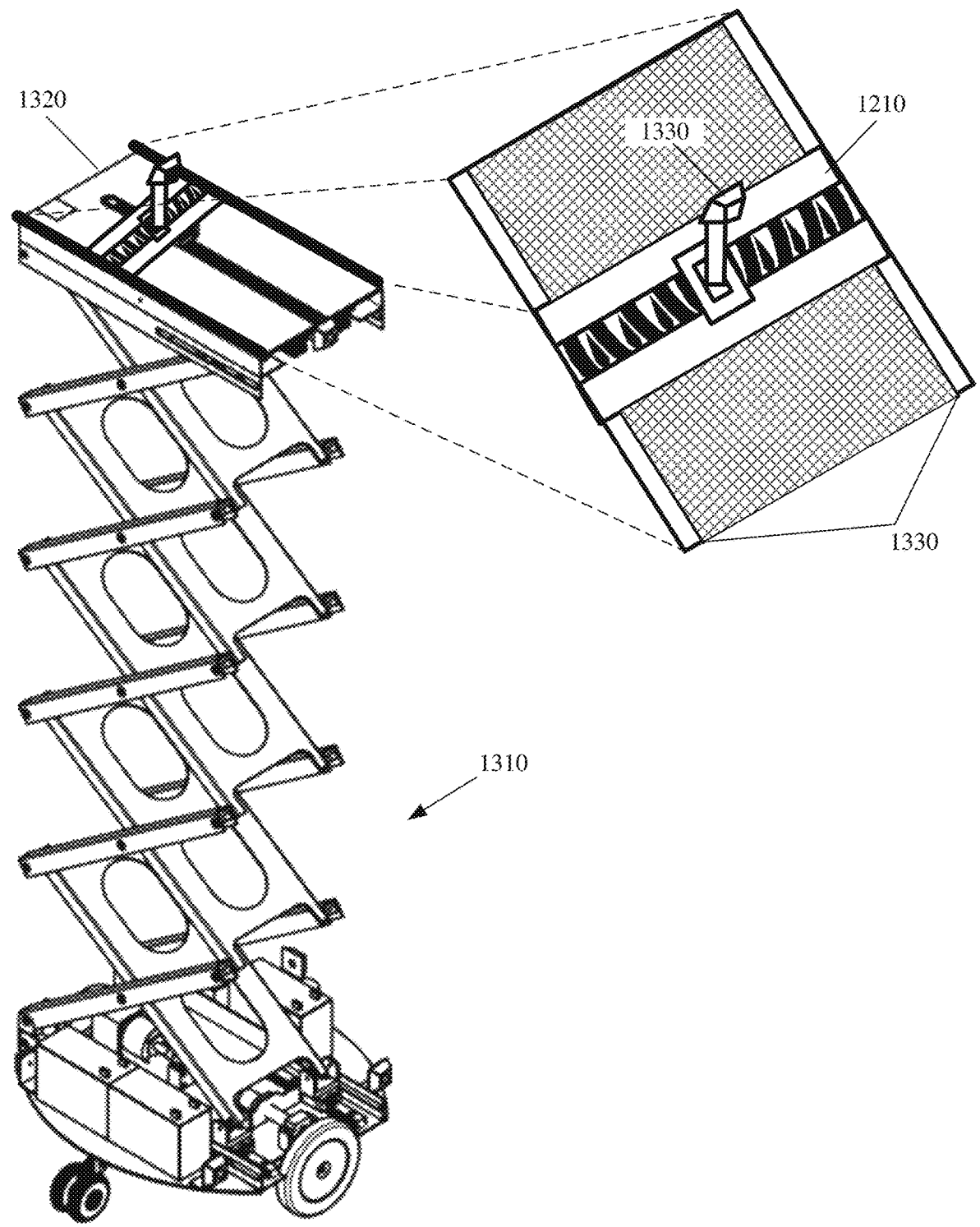
FIG. 13 illustrates a container placement robot modified with the passive displacing element.

FIG. 13 illustrates a container placement robot 1310 modified with the passive displacing element 1210. The robot 1310 includes a motorized base, an extendible lift, and an object or container retrieval and placement platform 1320. The figure also provides an enlarged view of the object or container retrieval and placement platform 1320.

The platform 1320 has a surface onto which a container or other object can be placed for transport by the robot 1310. An actuator 1330 can move from the back to the front of the platform. For example, the actuator 1330 can be disposed on a track and an electric motor can push the actuator 1330 through the track. As another example, the actuator 1330 can be an articulating arm or other extendible element that an electric motor can expand, collapse, or other otherwise manipulate. The actuator 1330 also has means with which to engage or hold a container or object. In this example, the actuator 1330 engages containers or other objects with a vacuum or powered suction.

Figure 14:
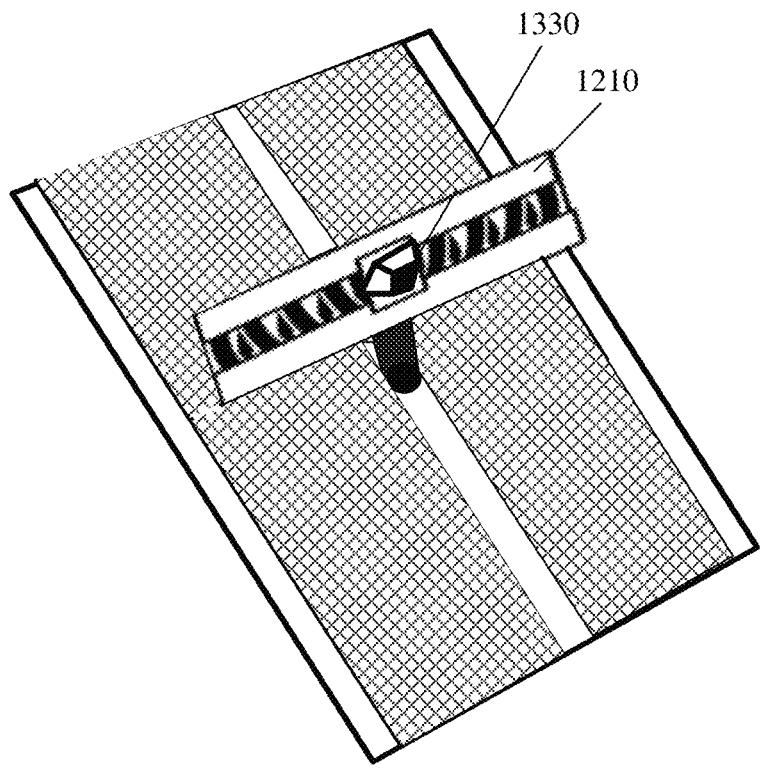
FIG. 14 illustrates an alternate placement of the passive displacing element adjacent to the actuator.

The actuator 1330 is mounted to the bracket of the passive displacing element 1210. The actuator 1330 may have a stem or base that couples to the bracket. The passive displacing element 1210 allows for lateral movement or shifting of the actuator 1330 in response to an external force directly or indirectly placed on the actuator 1330. The passive displacing element 1210 may directly couple the actuator to the platform 1320 or other fixed structure or body of the robot 1310. The passive displacing element 1210 may alternatively couple of a moveable structure on the platform 1320 or moveable structure of the robot 1310. For example, FIG. 14 illustrates an alternate placement of the passive displacing element 1210 adjacent to the actuator 1330. In this configuration, the track moves the passive displacing element 1210 along with the actuator 1330 in a first direction (e.g., from the back to the front of the platform 1320) and the passive displacing element 1210 allows for displacement of the actuator 1330 in a different second direction (e.g., laterally).

Figure 15:
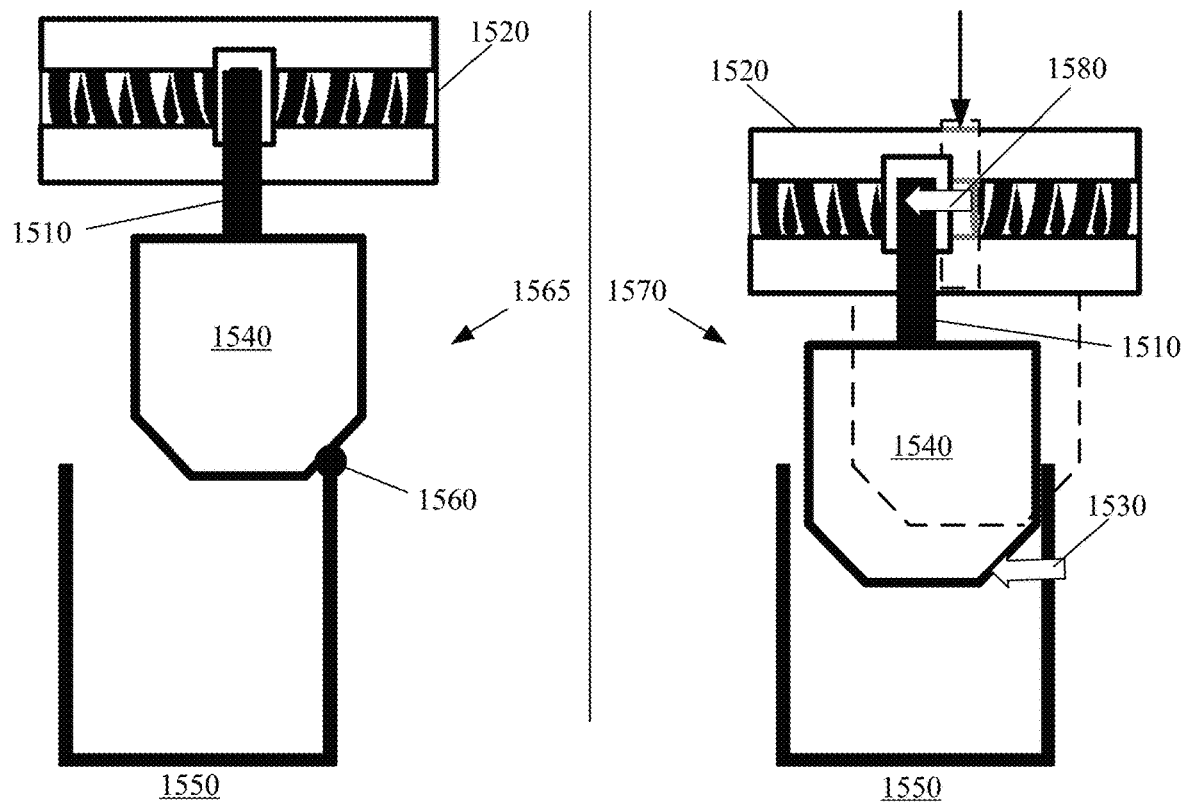
FIGS. 15 and 16 illustrate displacement of an actuator, by the passive displacing element, in response to an external force that is created from misaligned placement of a container with an alignment correcting end into a slot.
Figure 16:
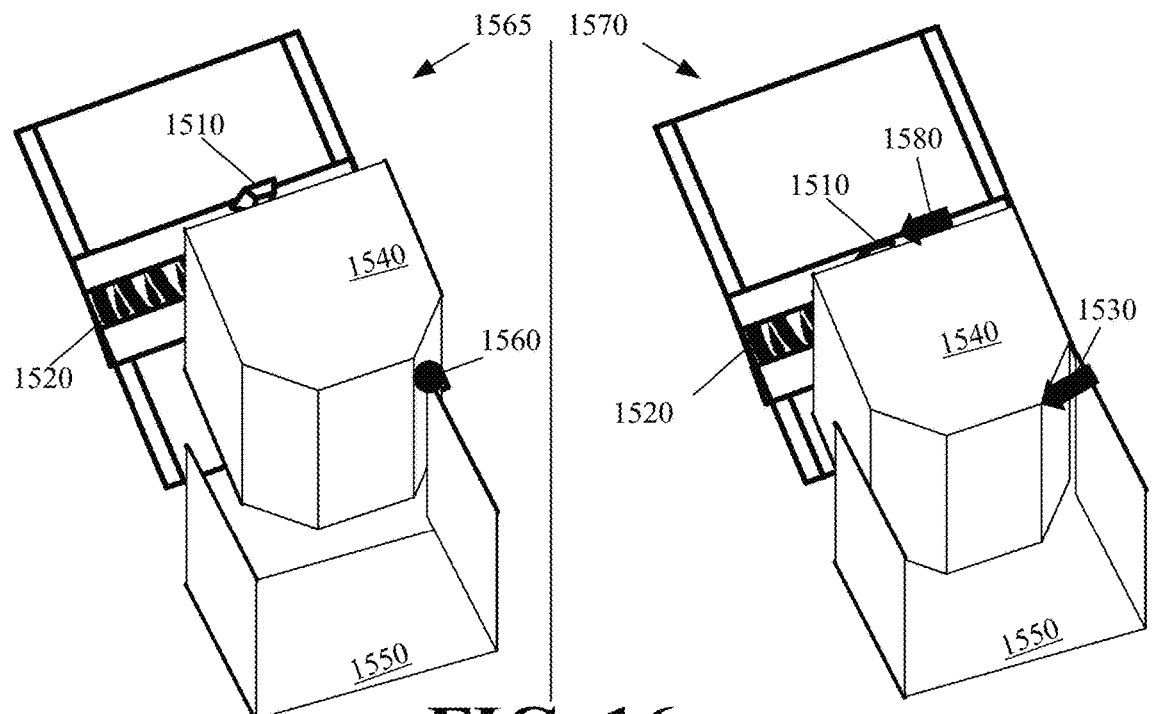

FIGS. 15 and 16 illustrate displacement of an actuator 1510, by the passive displacing element 1520, in response to an external force 1530 that is created from misaligned placement of a container 1540 with an alignment correcting end into a slot 1550. Each figure shows different stages of the container 1540 placement from a different perspective or view.

The first stage 1565 illustrates the misalignment of the container 1540 with the slot 1550 and the resulting contact (at 1560) between the alignment correcting end of the container 1540 and a wall of slot 1550.

The second stage 1570 shows displacement resulting from pushing the container 1540 a particular distance into the slot 1550 and the alignment correcting end of the container 1540 correcting for the misalignment by sliding past the slot 1550 barrier. More specifically, upon contact between the alignment correcting end of the container 1540 and the slot 1550 barrier, a lateral force 1530 is exerted on the container 1540, and, by extension, over to the actuator 1510 and the mount of the passive displacing element 1520 to which the actuator 1510 is mounted. The passive displacing element 1520 displaces (at 1580) the mount in response the force 1530, which in turn, displaces the actuator 1510 and the container 1540 more centrally within the slot 1550.

The displacement (at 1580) of the passive displacing element 1520, actuator 1510, and container 1540 relieves some or all of the external force 1530 that is exerted at the point of contact between the container 1540 and the slot barrier 1550, and also, the propagation of this force to the point at which the actuator 1510 engages the container 1540. Consequently, the actuator 1510 can retain its hold of the container 1540, without the container slipping, tilting, rotating, or otherwise moving at the point of engagement, as the force at this point is reduced by the displacing of the passive displacing element 1520. The actuator 1510 can continue pushing the container 1540 until it is fully in the slot 1550 with the displacement of the passive displacing element 1520, and more specifically, the mount within the rail, allowing for the originally misaligned container 1540 to become centered in the slot 1550.

Once the container 1540 is placed in the slot 1550, the actuator 1510 can disengage the container 1540. The external force 1530 on the actuator 1510 and passive displacing element 1520 is then removed, and the springs in the chamber of the passive displacing element return the mount to a central position within the chamber.

Attaching the passive displacing element vertically on the robot body provides for vertical displacement of the mount, actuators, and containers. Some embodiments of the passive displacing element provide two opposing sets of springs in order to provide horizontal and vertical displacement, or three dimensions of displacement.

The size of the rail determines the amount of displacement provided by the passive displacing element. The size of the rail may be commensurate with the size of the largest alignment correcting end of a container. More specifically, the rail should allow the mount to displace in either direction by a distance (e.g., width or height) equal to or greater than the inward extension (e.g., width or height) of either wall of the alignment correcting end.

The spring force for the opposing springs 1230 and 1235 of the passive displacing element 1210 can be different for different applications of the passive displacement element 1210. Springs 1230 and 1235 with a greater spring force may be set within the rail 1220 when a greater amount of external force is exerted on any of the containers engaged by the actuators, the actuators mounted to the passive displacing element mount 1240, or the mount 1240. Similarly, springs 1230 and 1235 with lesser spring force may be set within the rail 1220 when a lesser amount of lateral force is exerted on the any of the containers engaged by the actuators, the actuators mounted to the passive displacing element mount 1240, or the mount 1240.

Figure 17:
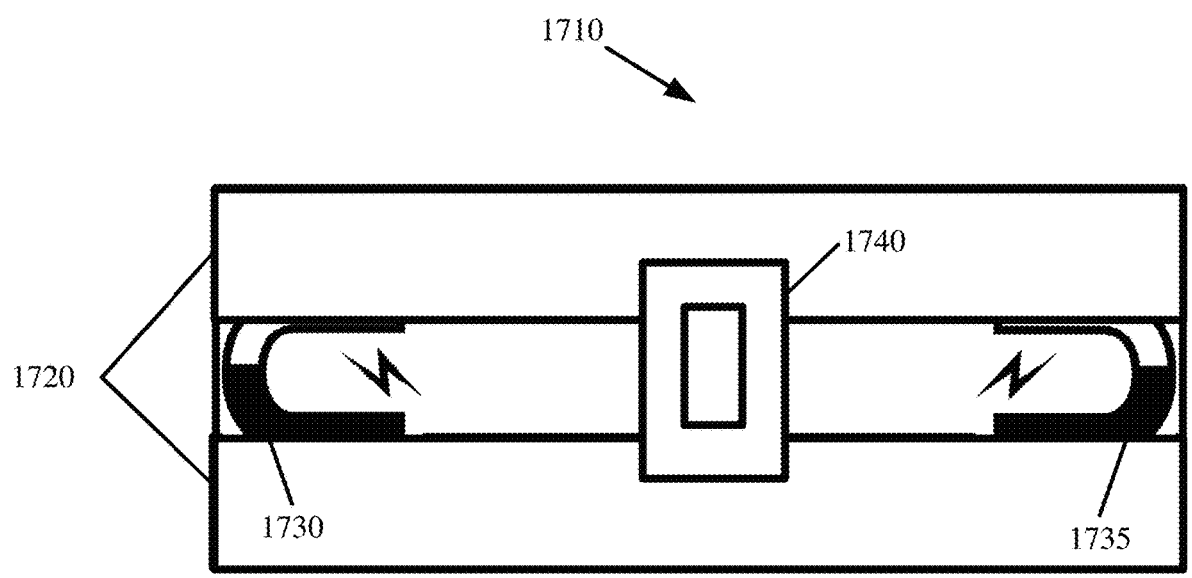
FIG. 17 conceptually illustrates a magnetic passive displacing element in accordance with some embodiments.

Some embodiments provide a passive displacing element with magnets in place of the springs. Such a passive displacing element uses magnetic forces, instead of spring forces, in order to control the displacement of the mount. FIG. 17 conceptually illustrates a magnetic passive displacing element 1710 in accordance with some embodiments.

In this figure, the passive displacing element 1710 has a rail 1720, but on either end of the rail 1720 is a permanent magnet 1730 and 1735. Some embodiments can also use electromagnets or electro-permanent magnets in addition to or instead of the permanent magnets 1730 and 1735. The permanent magnets 1730 and 1735 have the same polarity as the mount 1740. Consequently, the permanent magnets 1730 and 1735 place a repelling force on the mount 1740. The repelling force from either end of the rail 1720 centers the mount 1740. However, as an external force is exerted on the mount 1740, the actuators mounted to the mount 1740, or a container engaged by the actuators mount to the mount 1740, the external force can overcome the repelling force, and cause displacement of the mount 1740 in the direction of the exerted external force. Once the external force is reduced or removed, the repelling force of the magnets 1730 and 1735 center the mount 1740 within the rail 1720.

Some embodiments provide an active displacing element in which one or more motors, engines, power, or electricity are used to control the displacement of the mount, actuators mounted to the mount, and/or containers engaged by the actuators mounted to the mount. Passive displacing elements may be preferred to the active displacing elements for cost and simplicity reasons. However, an active displacing element may preemptively provide displacement of the mount based on one or more sensors to further reduce the external force on the container, actuators, and/or mount. For instance, rather than rely on the external force to produce the displacement, an active displacing element may include a sensor that detects a threshold amount of external force on the mount (whether directly exerted on the mount or indirectly exerted on the mount via the actuators or container). In response to detecting the threshold amount of external force, the active displacing element may power one or more motors to displace the mount until the amount of detected external force falls back below the threshold amount. The active displacing element can then return the mount to a centered or default position once the actuators disengage from a container or the detected amount of the external force falls below a second threshold or becomes undetectable.

The active displacing element may use a ball screw to translate rotational motion to linear motion. In particular, the mount is placed over a threaded shaft. A motor rotates the threaded shaft in one or two directions to displace the mount along a length of the threaded shaft. Other power or motorized means can be used to control the displacement of the mount for different embodiments of the active displacing element.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An apparatus comprising:
   a chamber comprising:
      an enclosed structure with an opening about a top side that spans horizontally from a left side to a right side of the enclosed structure;
      a first spring within the enclosed structure with a distal end connected to one side of the enclosed structure; and
      an opposing second spring within the enclosed structure with a distal end connected to an opposite side of the enclosed structure;
   a mount that is positioned within the opening about the top side of the enclosed structure with a vertical extension that is connected to a proximal end of the first spring and a proximal end of the second spring, wherein the first spring and the second spring dispose the mount at a central position of the chamber, wherein the first spring and second spring provide a lateral displacement of the mount in response to an application of a force and return the mount from the lateral displacement to the central position in response to removal of the force, and wherein the chamber restricts the lateral displacement to a horizontal movement of the mount about the opening on the top side of the enclosed structure by preventing a vertical displacement of the first spring or the second spring within the enclosed structure; and
   an actuator with which to engage a container or object, wherein the actuator is connected to the mount and moves in concert with the lateral displacement of the mount.

2. The apparatus of claim 1, wherein the lateral displacement of the mount in response to a compression of the first spring and an extension of the second spring produces an equivalent displacement of the actuator.

3. The apparatus of claim 1 further comprising:
   a platform comprising:
      a flat surface; and
      one or more tracks that move the mount in a direction that is perpendicular to the lateral displacement of the mount.

4. The apparatus of claim 3 further comprising:
   a motor coupled to the one or more tracks, the motor moving the mount across the one or more tracks.

5. The apparatus of claim 1, wherein the actuator comprises one or more of a vacuum, suction cup, articulating robotic arm, mechanical claw, pincher, magnet, air cannon, or motorized pushing element.

6. The apparatus of claim 1 further comprising:
   a bracket that connects the actuator to the mount and that elevates the actuator over the mount.

7. The apparatus of claim 1 further comprising:
   a motor that is coupled to the mount and that moves the mount in a direction that is perpendicular to the lateral displacement of the mount.

8. The apparatus of claim 1 further comprising:
   wiring running through the mount to the actuator, wherein the wiring supplies power to the actuator.

9. The apparatus of claim 1 further comprising:
   one or more sensors associated with the actuator, the one or more sensors detecting contact between the actuator and an object or a container.

10. The apparatus of claim 1 further comprising:
a platform into which the chamber is slidably mounted.

11. The apparatus of claim 1, wherein the first spring compresses in relation to an extension of the second spring.

12. The apparatus of claim 1, wherein the actuator comprises:
a mechanical element that pushes or pulls an object in front of the mount.

13. The apparatus of claim 1 further comprising:
a motorized base;
a lift mounted to the motorized base; and
a platform atop the lift, wherein the chamber is integrated as part of the platform.

* * * * *